(12) United States Patent
Yang et al.

(10) Patent No.: US 12,724,238 B2
(45) Date of Patent: Sep. 1, 2026

(54) LENS AND LENS ASSEMBLY INCLUDING THE SAME

(71) Applicant: SAMSUNG ELECTRO-MECHANICS CO., LTD., Suwon-si (KR)

(72) Inventors: Dong Shin Yang, Suwon-si (KR); Jong Gill Lee, Suwon-si (KR); Deok Seok Oh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 303 days.

(21) Appl. No.: 18/415,743

(22) Filed: Jan. 18, 2024

(65) Prior Publication Data

US 2024/0302577 A1 Sep. 12, 2024

(30) Foreign Application Priority Data

Mar. 7, 2023 (KR) ........................ 10-2023-0030191

(51) Int. Cl.

| | |
|---|---|
| *G02B 13/00* | (2006.01) |
| *G02B 5/00* | (2006.01) |
| *G02B 5/02* | (2006.01) |
| *G02B 7/02* | (2021.01) |
| *G02B 9/62* | (2006.01) |

(52) U.S. Cl.
CPC ......... *G02B 13/0045* (2013.01); *G02B 5/003* (2013.01); *G02B 5/0221* (2013.01); *G02B 7/021* (2013.01); *G02B 7/022* (2013.01); *G02B 9/62* (2013.01)

(58) Field of Classification Search
CPC ...... G02B 13/0045; G02B 7/021; G02B 9/62; G02B 5/003; G02B 5/0221; G02B 7/022
See application file for complete search history.

(56) References Cited

U.S. PATENT DOCUMENTS

| | | | | |
|---|---|---|---|---|
| 9,952,359 | B2 | 4/2018 | Chang | |
| 2012/0050871 | A1 | 3/2012 | Sakai et al. | |
| 2015/0103407 | A1 | 4/2015 | Chen | |
| 2017/0227735 | A1* | 8/2017 | Chou | G02B 7/021 |
| 2018/0246256 | A1 | 8/2018 | Abe | |
| 2020/0103611 | A1* | 4/2020 | Yang | G02B 7/022 |

FOREIGN PATENT DOCUMENTS

| | | | | | |
|---|---|---|---|---|---|
| JP | 2012-73590 | A | | 4/2012 | |
| JP | 6971587 | B2 | | 11/2021 | |
| KR | 10-2021-0044552 | A | | 4/2021 | |
| KR | 20210044552 | A | * | 4/2021 | G02B 13/0045 |
| TW | 1400550 | B | * | 7/2013 | |

* cited by examiner

*Primary Examiner* — Jia X Pan
(74) *Attorney, Agent, or Firm* — NSIP Law

(57) ABSTRACT

A lens includes an optical portion configured to refract light, and a flange portion extending from the optical portion, wherein a first region having first surface roughness, a second region having second surface roughness, and a third region having third surface roughness are sequentially disposed from the optical portion toward the flange portion, on at least one of an object-side surface and an image-side surface of the flange portion, the first surface roughness and the third surface roughness are greater than the second surface roughness, and a light blocking portion is disposed in the second region.

14 Claims, 4 Drawing Sheets

LENS AND LENS ASSEMBLY INCLUDING THE SAME

CROSS-REFERENCE TO RELATED APPLICATIONS

This application claims the benefit under 35 USC 119 (a) of Korean Patent Application No. 10-2023-0030191 filed on Mar. 7, 2023, in the Korean Intellectual Property Office, the entire disclosure of which is incorporated herein by reference for all purposes.

BACKGROUND

1. Field

The present disclosure relates to a lens and a lens assembly including the same.

2. Description of the Background

Camera modules may be used in portable electronic devices such as smartphones.

The camera module may be provided with a lens assembly including a plurality of lenses. The plurality of lenses respectively may include an optical portion through which light passes and is refracted, and a flange portion extending from the optical portion.

The flange portion is not related to image formation, but when light is reflected from the flange portion, a flare or ghost phenomenon may occur in the captured image.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens includes an optical portion configured to refract light, and a flange portion extending from the optical portion, wherein a first region having first surface roughness, a second region having second surface roughness, and a third region having third surface roughness are sequentially disposed from the optical portion toward the flange portion, on at least one of an object-side surface and an image-side surface of the flange portion, the first surface roughness and the third surface roughness are greater than the second surface roughness, and a light blocking portion is disposed in the second region.

The light blocking portion may be black.

The light blocking portion may be disposed to extend from a surface of the second region to an inside of the flange portion.

A portion of the light blocking portion disposed to extend to the inside of the flange portion may overlap a surface of the first region in an optical axis direction.

A portion of the light blocking portion disposed to extend to the inside of the flange portion may overlap a surface of the third region in an optical axis direction.

When a difference between the first surface roughness and the second surface roughness is Ra1, Ra1 may be 0.2 μm (microns) or more.

The first region, the second region, and the third region may be formed continuously in a circumferential direction of the flange portion.

The light blocking portion may be continuously disposed in the circumferential direction of the flange portion.

The first surface roughness may be greater in a portion, adjacent to the second region than in a portion, adjacent to the optical portion.

The first surface roughness may become greater from the optical portion toward the second region.

The light blocking portion may be spaced apart from the optical portion by at least a portion of the first region.

The light blocking portion may be spaced apart from an outer end of the flange portion by at least a portion of the third region.

In another general aspect, a lens assembly includes a plurality of lenses disposed along an optical axis, and respectively including an optical portion configured to refract light and a flange portion extending from the optical portion, and a lens barrel accommodating the plurality of lenses, wherein one or more lenses of the plurality of lenses include a light blocking portion disposed on a surface of the flange portion, the light blocking portion is disposed at a position spaced apart from the optical portion by a predetermined distance, and a surface of the flange portion on which the light blocking portion is disposed has lower surface roughness than other surfaces of the flange portion.

The light blocking portion may be disposed to extend from the surface of the flange portion to the inside of the flange portion.

The light blocking portion disposed inside the flange portion may have an irregular shape.

The surface of the flange portion located between the light blocking portion and the optical portion may have greater surface roughness than the surface of the flange portion located between the light blocking portion and an outer end of the flange portion.

Other features and aspects will be apparent from the following detailed description, the drawings, and the claims.

Figure 1:
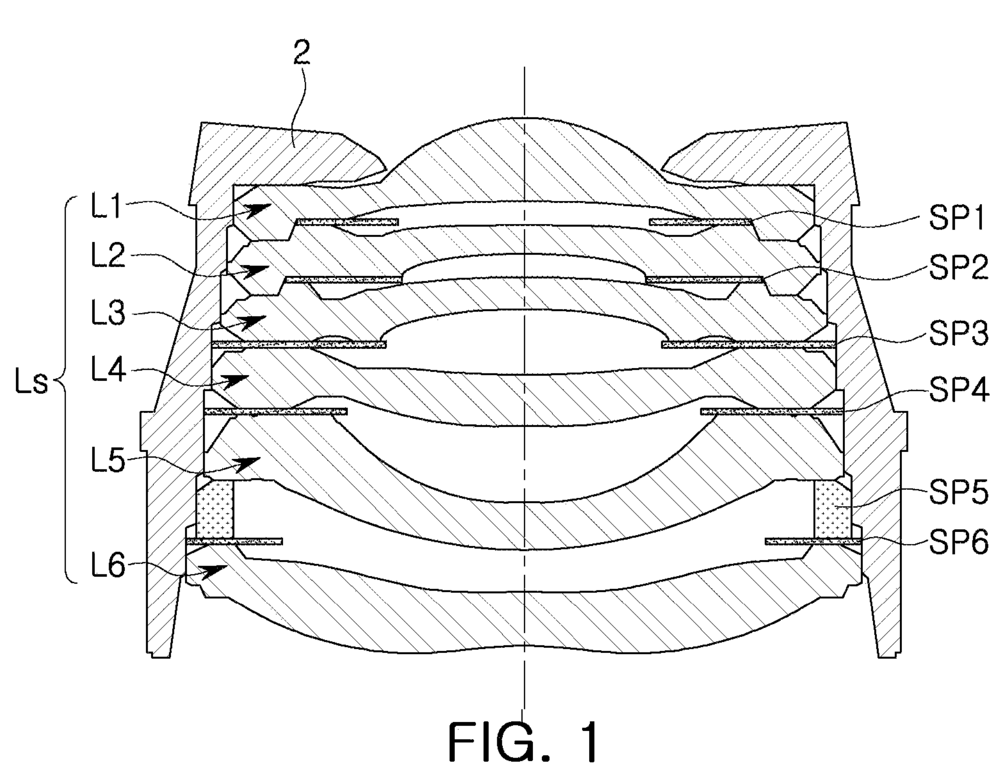
FIG. 1 is a schematic cross-sectional view of a lens assembly according to an embodiment of the present disclosure.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a lens that can prevent a flare phenomenon due to unintended light reflection and a lens assembly including the same.

Figure 2:
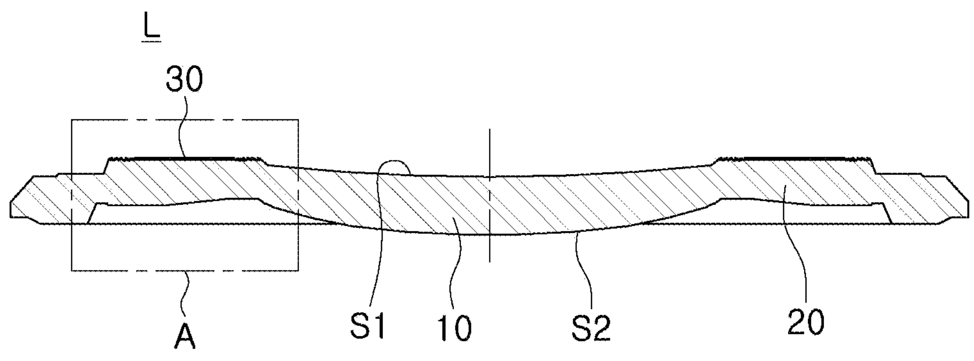
FIG. 2 is a schematic cross-sectional view of a lens according to an embodiment of the present disclosure.
Figure 3:
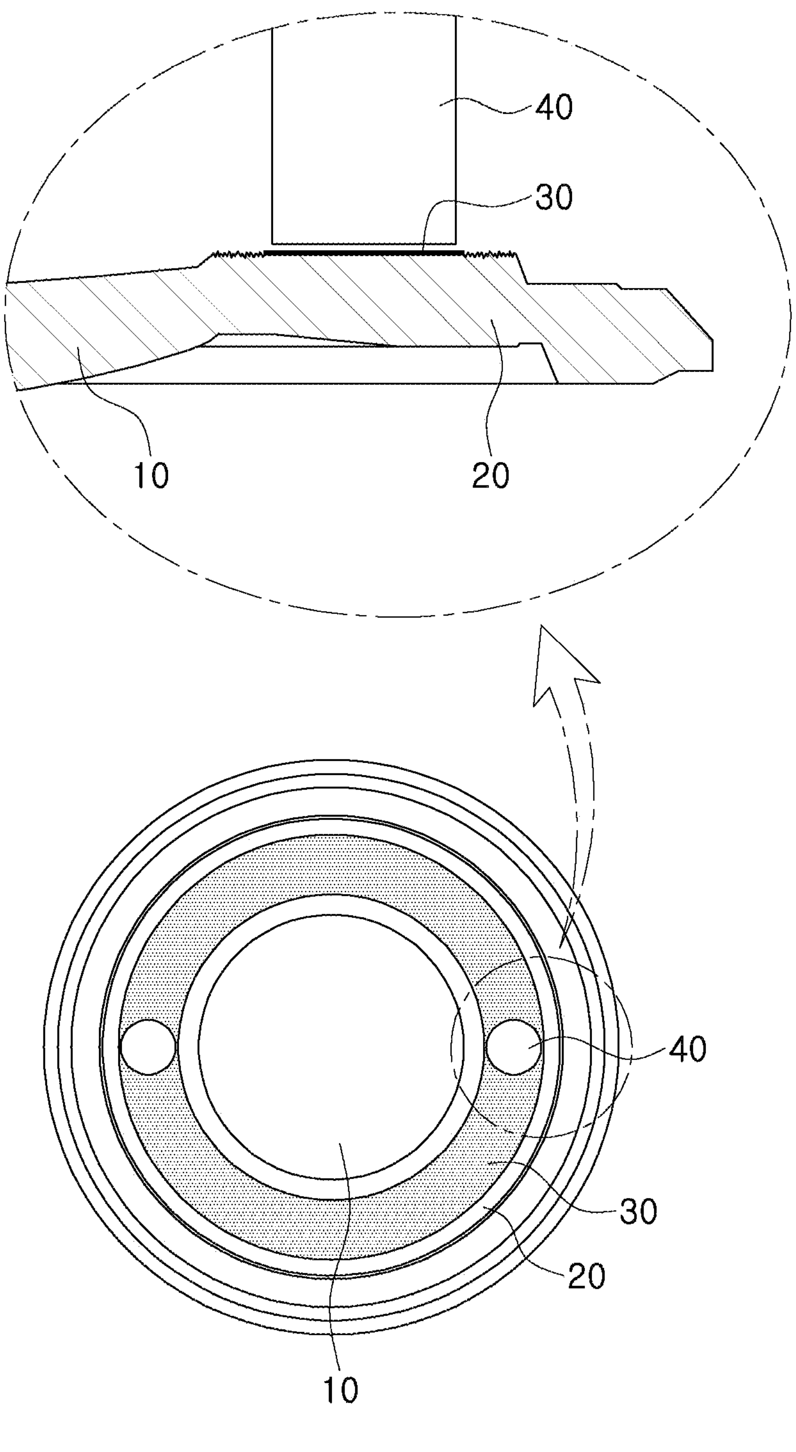
FIG. 3 is a diagram illustrating the process of forming a light blocking portion in a lens according to an embodiment of the present disclosure.

FIG. 1 is a schematic cross-sectional view of a lens assembly according to an embodiment of the present disclosure, FIG. 2 is a schematic cross-sectional view of a lens according to an embodiment of the present disclosure, and FIG. 3 is a diagram illustrating the process of forming a light blocking portion in a lens according to an embodiment of the present disclosure.

Referring to FIGS. 1 to 3, a lens assembly 1 according to an embodiment of the present disclosure may include a plurality of lenses Ls disposed along an optical axis. In addition, the lens assembly 1 may further include a lens barrel 2 accommodating a plurality of lenses Ls. The plurality of lenses Ls may be disposed to be spaced apart from each other by a preset distance along the optical axis.

The plurality of lenses Ls may include six or more lenses. For example, in the present embodiment, the plurality of lenses Ls include a first lens L1, a second lens L2, a third lens L3, a fourth lens L4, a fifth lens L5, and a sixth lens L6, disposed from an object side toward an image side along an optical axis.

The first lens L1 refers to a lens closest to an object (or subject), and the sixth lens L6 refers to a lens closest to an image sensor.

However, the spirit of the present disclosure is not limited by the number of lenses.

Each of the plurality of lenses Ls includes an optical portion 10 and a flange portion 20.

The optical portion 10 may be a portion in which optical performance of a lens L of the plurality of lenses Ls is illustrated. For example, light reflected from an object (or subject) may pass through the optical portion 10 and be refracted.

The flange portion 20 may be configured to fix the lens L to another component, for example, a lens barrel 2, another lens, or a spacer. The flange portion 20 extends from a circumference of the optical portion 10, and is formed integrally with the optical portion 10.

A spacer may be provided between adjacent lenses. At least a portion of the flange portion 20 of each of the plurality of lenses may be in contact with the spacer. The spacer may maintain a gap between lenses, and block unnecessary light.

Each spacer may be provided with a light absorption layer to block unnecessary light. The light absorption layer may be a black film or black iron oxide.

The spacer may include a first spacer SP1, a second spacer SP2, a third spacer SP3, a fourth spacer SP4, a fifth spacer SP5, and a sixth spacer SP6, disposed from an object side toward an image sensor.

The first spacer SP1 is disposed between the first lens L1 and the second lens L2, the second spacer SP2 is disposed between the second lens L2 and the third lens L3, the third spacer SP3 is disposed between the third lens L3 and the third lens L4, the fourth spacer SP4 is disposed between the fourth lens L4 and the fifth lens L5, and the fifth spacer SP5 is disposed between the fifth lens L5 and the sixth lens L6. The sixth spacer S6 may also be disposed between the fifth lens L5 and the sixth lens L6. In addition, the sixth spacer SP6 may be disposed between the fifth spacer SP5 and the sixth lens L6.

The fifth spacer SP5 may be formed to have the thickest thickness among the plurality of spacers. For example, the thickness of the fifth spacer SP5 in an optical axis direction may be thicker than thicknesses of the other spacers in the optical axis direction.

The lens L according to an embodiment of the present disclosure is formed of a plastic material. For example, the lens L may be injection molded by injecting a resin material into a mold.

Each lens includes an object-side surface S1 (a surface toward an object side) and an image-side surface S2 (a surface toward an image sensor).

Meanwhile, light reflected from an object (or subject) passes through the lens and is refracted, and in this case, unintended light reflection may occur. Unintentional reflection of light is light that is not related to image formation, which causes a flare phenomenon in the captured image.

For example, when light is incident on the flange portion 20 of the lens L, unintended reflection may occur in the flange portion 20.

As described above, light diffusely reflected from the lens L is light that is not related to image formation, which causes a flare phenomenon in the captured image.

Therefore, in order to prevent the flare phenomenon due to diffusely reflected light, the lens L according to an embodiment of the present disclosure has great surface roughness on at least one of the object-side surface S1 and the image-side surface S2 of the flange portion 20 of the lens L.

Surface treatment may be performed to increase surface roughness, and here, the surface treatment may mean corrosion, chemical etching, physical grinding, or the like. In addition, it is possible to increase the roughness of the surface of the flange portion 20 during an injection molding process by creating an uneven shape in a cavity of a mold.

Therefore, even if light is incident on the flange portion 20, the reflected light can be scattered by roughening the surface of the flange portion 20, thereby preventing the flare phenomenon.

In addition, a light blocking portion 30 may be disposed on the surface of the flange portion 20 of the lens L to block unnecessary light. The light blocking portion 30 may be black.

Referring to FIG. 3, black dye is sprayed through a spray nozzle 40 at two or more arbitrary points among the surface of the flange portion 20 of the lens L. Black dye has low viscosity and diffuses easily.

Black dye includes non-polar dye. In addition, the black dye may further include a solvent that dissolves the non-polar dye.

Non-polar dye can refer to dyes that have little or no polarity. In addition, the non-polar dye may be hydrophobic. Therefore, the non-polar dye may have an excellent effect of coloring a plastic lens.

The black dye diffuses in a circumferential direction of the flange portion 20 of the lens L from two or more sprayed points. Accordingly, a light blocking portion 30 can be formed on the surface of the flange portion 20.

Here, if the black dye diffuses and overflows into the optical portion 10, problems may occur in the optical performance of the lens L, so it is necessary to allow the black dye to diffuse into a desired location.

Figure 4:
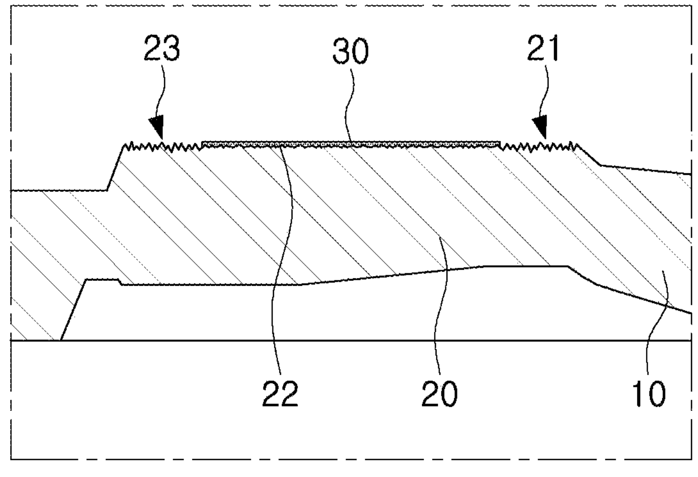
FIG. 4 is an enlarged view of portion A of FIG. 2.
Figure 5:
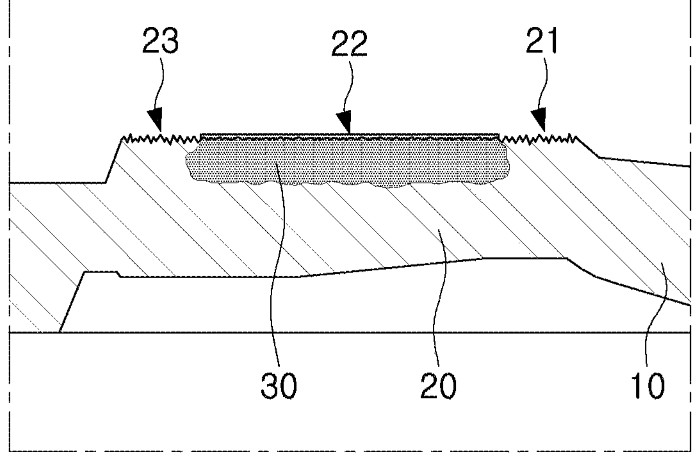
FIG. 5 is a modified example of FIG. 4.

FIG. 4 is an enlarged view of portion A of FIG. 2, and FIG. 5 is a modified example of FIG. 4.

First, referring to FIG. 4, a lens L according to an embodiment of the present disclosure is formed to have various levels of surface roughness in a flange portion 20 (e.g., at least one of an object-side surface S1 and an image-side surface S2)

For example, on the surface of the flange portion 20, a first region 21 having first surface roughness, a second region 22 having second surface roughness, and a third region 23 having third surface roughness may be sequentially disposed from the optical portion 10 toward the flange portion 20.

The first to third regions 21 to 23 may be formed continuously in a circumferential direction of the flange portion 20.

A surface area of the second region 22 may be greater than a surface area of the first region 21 and a surface area of the third region 23. In addition, the surface area of the second region 22 may be greater than the sum of the surface area of the first region 21 and the surface area of the third region 23.

In the present embodiment, the surface of the flange portion 20 on which the first to third regions 21 to 23 are formed may be a plane extending in a direction perpendicular to an optical axis (Z-axis).

Each of the first surface roughness and the third surface roughness may be greater than the second surface roughness, and the light blocking portion 30 may be disposed in the second region 20 having the second surface roughness.

That is, black dye may be sprayed in a region with lower surface roughness, and the black dye may be diffused in a region with lower surface roughness to form a light blocking portion 30 at a preset position of the flange portion 20. The light blocking portion 30 may be continuously disposed along a circumferential direction of the flange portion 20.

Meanwhile, in the present specification, surface roughness may refer to arithmetic average roughness (Ra).

Each of the first surface roughness and the third surface roughness may be greater than the second surface roughness, and a size of the surface therebetween may be the same or different from each other.

When a difference between the first surface roughness and the second surface roughness is Ra1, Ra1 may be 0.2 μm or more.

When a difference between the second surface roughness and the third surface roughness is Ra2, Ra2 may be 0.2 μm or more.

The first surface roughness of the first region 21 may be greater in a portion adjacent to the second region 22 than in a portion adjacent to the optical portion 10. Alternatively, the first surface roughness of the first region 21 may be configured to gradually increase as it moves from the optical portion 10 toward the second region 22.

The third surface roughness of the third region 23 may be greater in a portion adjacent to the second region 22 than in a portion adjacent to an outer end of the flange portion 20. Alternatively, the third surface roughness of the third region 23 may be configured to gradually increase as it moves from the outer end of the flange portion 20 toward the second region 22.

Since the first region 21 is located closer to the optical portion 10 than the third region 23, based on the second region 22, the first surface roughness of the first region 21 may also be greater than the third surface roughness of the third region 23.

When the surface roughness of each region changes even within the corresponding region, the surface roughness of each region may refer to average surface roughness of the entire region.

Since the first region 21 and the third region 23 with greater surface roughness surround the second region 22 with lower surface roughness, when black dye is sprayed and diffused to two or more arbitrary points in the second region 22, the first region 21 and the third region 23 having greater surface roughness, may serve as a barrier to prevent the black dye from further diffusing. That is, by spraying the black dye into the second region 22 having lower surface roughness, the black dye can diffuse within the second region 22 and penetrate into the surface of the second region 22.

By configuring it as described above, it is possible to prevent the black dye, which has low viscosity and easily diffusing properties, from overflowing into the optical portion 10 during the process of diffusion along the circumferential direction of the flange portion, and to form a light blocking portion 30 at a desired location.

Referring to FIG. 5, the black dye sprayed on the surface of the flange portion 20 may also penetrate into the flange portion.

For example, the light blocking portion 30 may be disposed on a surface of the second region 22, and disposed to extend from the surface of the second region 22 to an inside of the flange portion 20. The light blocking portion 30 disposed inside the flange portion 20 may have an irregular shape.

A portion of the light blocking portion 30 disposed inside the flange portion 20 may overlap the surface of the first region 21 in an optical axis direction.

In addition, a portion of the light blocking portion 30 disposed inside the flange portion 20 may overlap the surface of the third region 23 in an optical axis direction.

Figure 6:
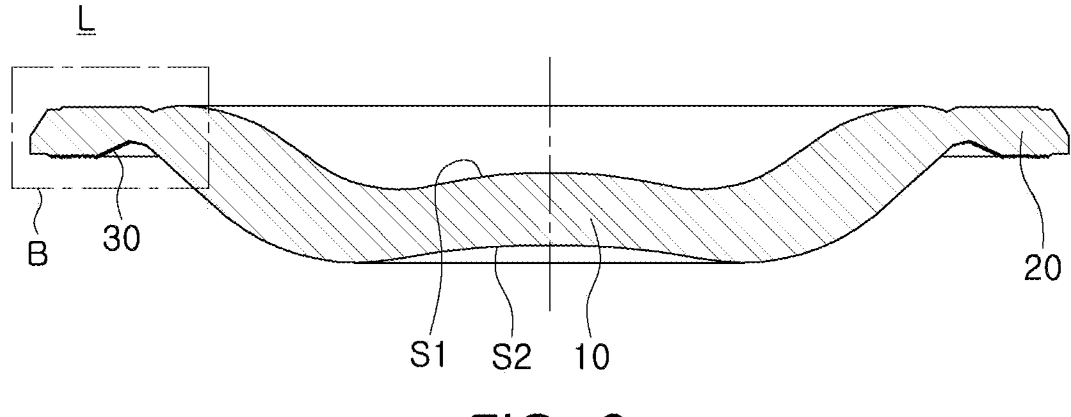
FIG. 6 is a schematic cross-sectional view of a lens according to another embodiment of the present disclosure.
Figure 7:
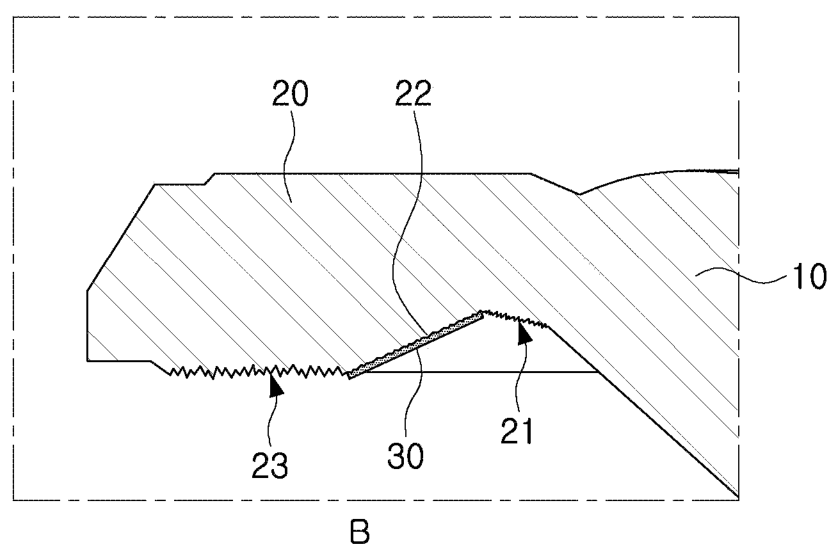
FIG. 7 is an enlarged view of portion B of FIG. 6.

FIG. 6 is a schematic cross-sectional view of a lens according to another embodiment of the present disclosure; FIG. 7 is an enlarged view of portion B of FIG. 6; and FIG. 8 is a modified example of FIG. 7.

Figure 8:
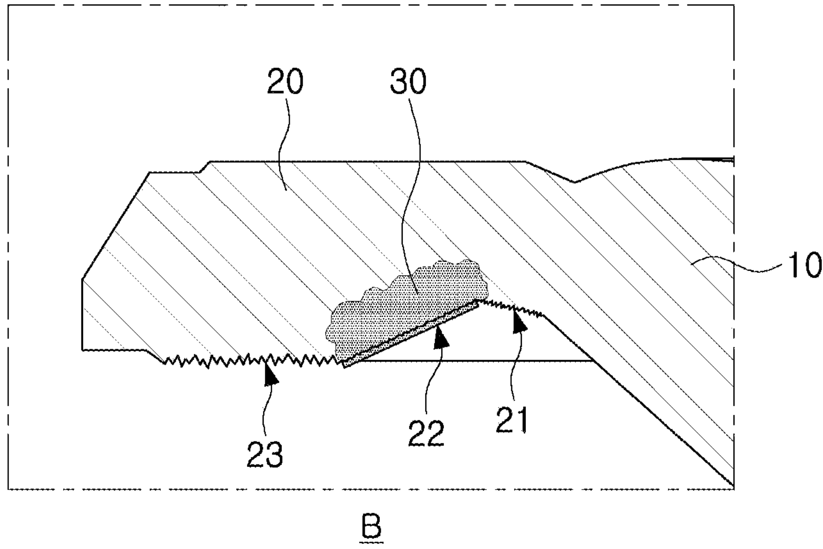
FIG. 8 is a modified example of FIG. 7.

Referring to FIGS. 6 to 8, the first to third regions 21 to 23 may be formed on an image-side surface of the flange portion 20.

A surface of the first region 21 and a surface of the second region 22 may be formed as an inclined surface.

The surface of the first region 21 and the surface of the second region 22 may be inclined in opposite directions. For example, the surface of the first region 21 may be inclined upwardly from the optical portion 10 toward the second region 22, and the surface of the second region 22 may be inclined downwardly from the first region 21 toward the third region 23.

Since the remaining configuration of the light blocking portion 30 is similar to the lens according to an embodiment of the present disclosure described with reference to FIGS. 1 to 5, further detailed description thereof will be omitted.

As set forth above, according to an embodiment of the present disclosure, a lens according to an embodiment of the present disclosure and a lens assembly including the same may prevent a flare phenomenon caused by unintentional light reflection.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens, comprising:

an optical portion configured to refract light; and a flange portion extending from the optical portion, wherein a first region having first surface roughness, a second region having second surface roughness, and a third region having third surface roughness are sequentially disposed from the optical portion toward the flange portion, on at least one of an object-side surface and an image-side surface of the flange portion, wherein the first surface roughness and the third surface roughness are greater than the second surface roughness, wherein a light blocking portion is disposed in the second region, and wherein the light blocking portion is disposed to extend from a surface of the second region to an inside of the flange portion.

2. The lens of claim 1, wherein the light blocking portion is black.

3. The lens of claim 1, wherein a portion of the light blocking portion disposed to extend to the inside of the flange portion overlaps a surface of the first region in an optical axis direction.

4. The lens of claim 1, wherein a portion of the light blocking portion disposed to extend to the inside of the flange portion overlaps a surface of the third region in an optical axis direction.

5. The lens of claim 1, wherein a difference between the first surface roughness and the second surface roughness is Ra1, Ra1 is 0.2 μm or more.

6. The lens of claim 1, wherein the first region, the second region, and the third region are formed continuously in a circumferential direction of the flange portion.

7. The lens of claim 6, wherein the light blocking portion is continuously disposed in the circumferential direction of the flange portion.

8. The lens of claim 1, wherein the first surface roughness is greater in a portion, adjacent to the second region than in a portion, adjacent to the optical portion.

9. The lens of claim 1, wherein the first surface roughness becomes greater from the optical portion toward the second region.

10. The lens of claim 1, wherein the light blocking portion is spaced apart from the optical portion by at least a portion of the first region.

11. The lens of claim 1, wherein the light blocking portion is spaced apart from an outer end of the flange portion by at least a portion of the third region.

12. A lens assembly, comprising:

a plurality of lenses disposed along an optical axis, and respectively including an optical portion configured to refract light and a flange portion extending from the optical portion; and a lens barrel accommodating the plurality of lenses, wherein one or more lenses of the plurality of lenses include a light blocking portion disposed on a surface of the flange portion, wherein the light blocking portion is disposed at a position spaced apart from the optical portion by a predetermined distance, wherein the surface of the flange portion on which the light blocking portion is disposed has lower surface roughness than other surfaces of the flange portion, and wherein the light blocking portion is disposed to extend from the surface of the flange portion to an inside of the flange portion.

13. The lens assembly of claim 12, wherein the light blocking portion disposed inside the flange portion has an irregular shape.

14. The lens assembly of claim 12, wherein the surface of the flange portion located between the light blocking portion and the optical portion has greater surface roughness than the surface of the flange portion located between the light blocking portion and an outer end of the flange portion.

* * * * *